Feb. 3, 1970　　　　　　　M. C. HUFFMAN　　　　　　3,493,200
POSITIONER FOR ROCK DRILLS
Filed Feb. 9, 1968　　　　　　　　　　　　　　4 Sheets-Sheet 1

INVENTOR.
MERVIN C. HUFFMAN
BY Joseph W. Holloway
ATTORNEY

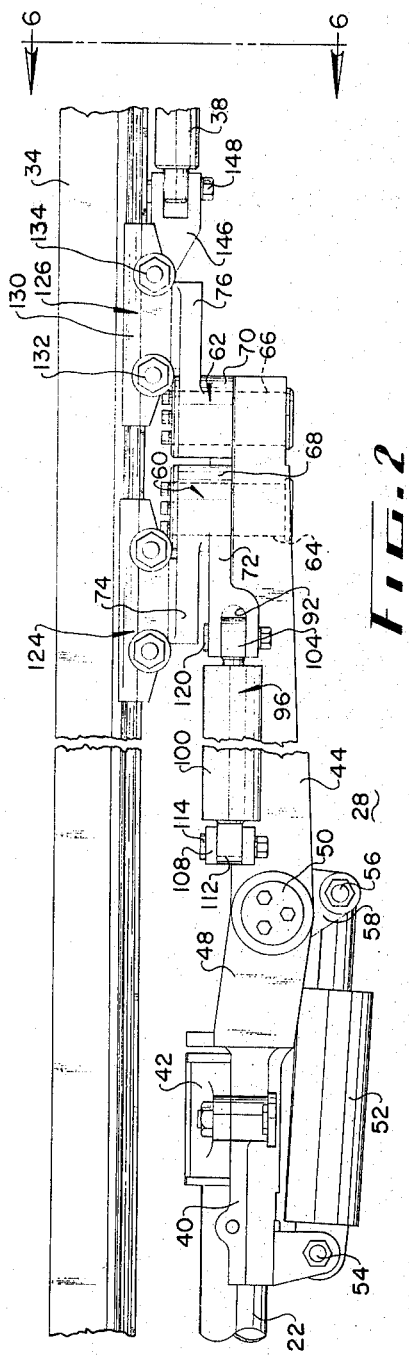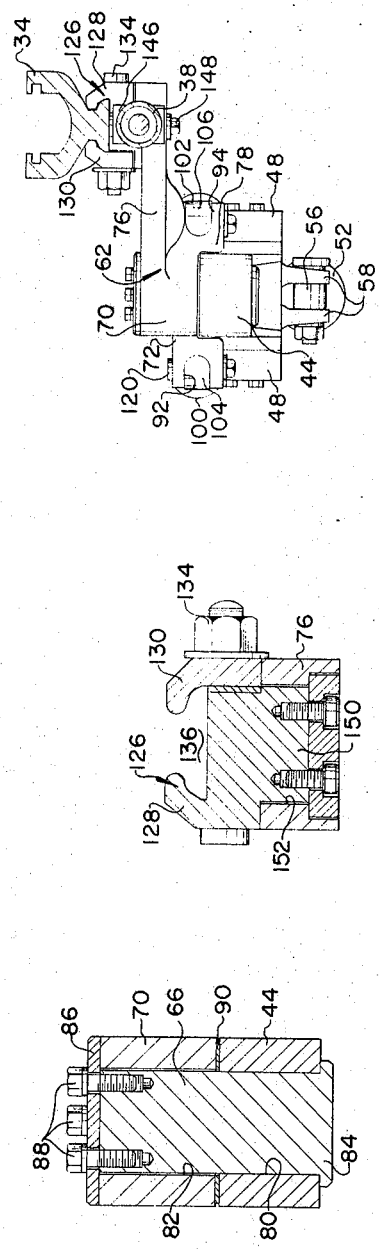

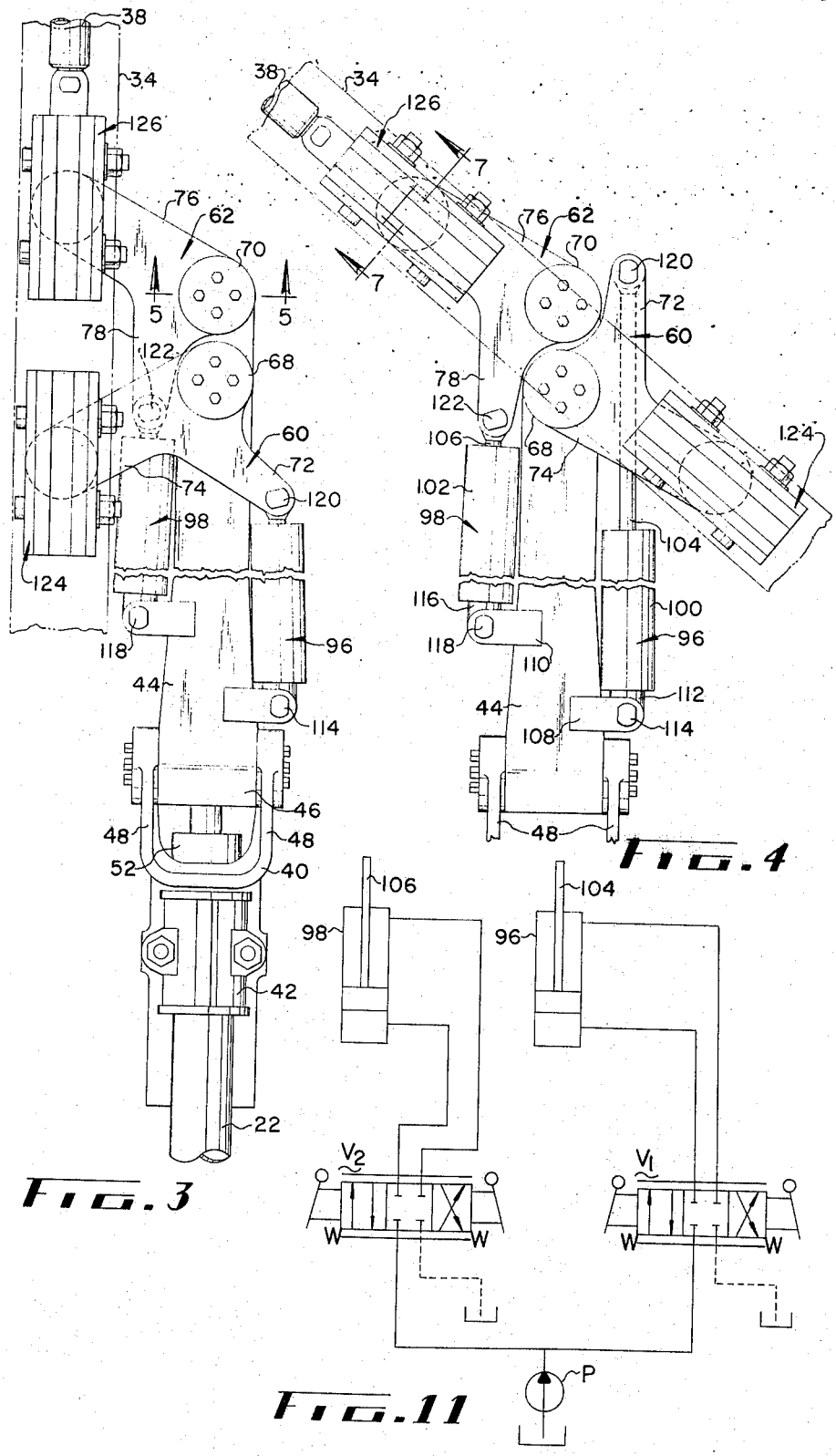

United States Patent Office 3,493,200
Patented Feb. 3, 1970

---

3,493,200
POSITIONER FOR ROCK DRILLS
Mervin C. Huffman, Denver, Colo., assignor to Gardner-Denver Company, a corporation of Delaware
Filed Feb. 9, 1968, Ser. No. 704,294
Int. Cl. E21c 11/00, 9/00; F16m 11/00, 13/00
U.S. Cl. 248—16
10 Claims

ABSTRACT OF THE DISCLOSURE

A positioner for a rock drill comprising a support member adapted to mount a pair of cranks which carry a guide shell for the drill. The cranks are pivotally mounted in spaced relation on the support member and are individually movable by associated power cylinders attached between the respective cranks and the support member. The power cylinders are remotely controlled for piston extension and retraction either in unison or individually. Equal extension or retraction of both power cylinders in unison will pivot the cranks so that the guide shell moves laterally with respect to the support member. By operating the power cylinders one at a time or at unequal rates of extension or retraction, the guide shell can be positioned at a selected angle to the support member.

---

BACKGROUND OF THE INVENTION

The drill positioner disclosed herein is particularly well suited for incorporation with a rock drilling unit of the type employed in drilling shot holes in the working face of a tunnel or a mine. The hole pattern to be drilled in such faces may comprise a multiplicity of horizontally and vertically spaced holes which extend perpendicularly into the face or at an angle to the face, the holes being in parallel or in angled relationship to one another.

Maneuverability, speed and accuracy are required in a positioner where large faces and complex, multihole patterns are involved. With respect to the distal end of the boom, the positioner should be capable of maneuvering the drill guide shell for pivoting in horizontal and vertical planes; and, the guide shell should be shiftable laterally to cross over from one side of the boom to the other as drilling conditions require.

U.S. Patent 3,212,738 issued to Curtis et al. discloses a positioner which meets the positioning requirements generally stated hereinabove. Structurally, the Curtis positioner incorporates a rectangular supporting frame which is attached at right angles to the distal end of the boom; and, a power drive means slides the guide shell transversely along the supporting frame from one side of the boom to the other. A separate power means is required by Curtis for pivoting the guide shell relative to the supporting frame. An object of the invention disclosed herein is to provide a positioner of the type disclosed in Curtis, but which eliminates both the transverse slide frame and the separate power means for pivoting the guide shell.

SUMMARY OF THE INVENTION

The invention generally contemplates a positioner for a rock drill guide shell which differs from those known to date in that the guide shell is carried by power controlled crank means which provide both lateral and angular movements of the guide shell. Such lateral and angular movements may be effected sequentially or simultaneously, as desired, simply by moving the supporting cranks about their pivots. The pivoting means for the cranks may comprise a pair of extensible power cylinders which are substantially parallel with one another and with a boom or jib which carries the positioner.

The use of ordinary crank means powered by conventional cylinders provides an extremely simple, but rugged positioner which is economical to manufacture, easy to maintain, and reliable and efficient in operation. Moreover, the present positioner is compact, having no appreciable extension to the side of the boom means which supports it.

These and other objects and advantages of the invention will appear upon reading the following specification and claims in connection with the attached drawings wherein:

FIG. 2 is an enlarged fragmentary view of a positioner assembly for moving a guide shell with respect to the distal end of a boom;

FIG. 3 is a top view of the positioner assembly shown in FIG. 2 with the guide shell shown in outline by phantom lines;

FIG. 4 is a view similar to FIG. 3 showing the positioner assembly in another operated condition;

FIG. 5 is an enlarged section taken along line 5—5 of FIG. 3;

FIG. 6 is an end view looking along lines 6—6 of FIG. 2;

FIG. 7 is an enlarged section taken along lines 7—7 of FIG. 4;

FIG. 11 is a schematic view of a power and control system for the crank cylinders of the positioner assembly.

Figure 1:
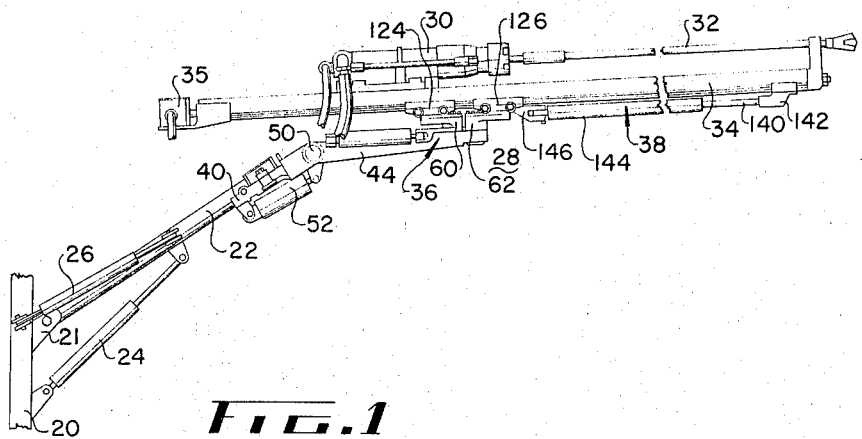
FIG. 1 is a side elevational view of a complete rock drilling unit mounted on an adjustable boom.

FIG. 1 shows an upstanding frame 20 having a mounting bracket 21 for a boom or jib 22 which is vertically and horizontally swingable by a lift cylinder 24 and a swing cylinder 26. The cylinders 24 and 26 are power extensible and retractable for locating a boom-carried rock drilling unit, generally designated at numeral 28, with respect to the frame 20 and to a work face. The motive fluid supply lines for the various power cylinders shown in the drawings have been left out in order to simplify the drawings and to more clearly show the novel structural and mechanical features of the invention. The rock drilling unit 28 is mounted at the distal end of the boom 22 and includes a percussive rock drill 30 which actuates a drill rod-drill bit assembly 32, a guide or feed shell 34 which carries the drill and along which the drill is advanced and retracted by a power means 35, a guide shell supporting assembly, generally indicated at 36, and a guide shell extension cylinder 38 for sliding the guide shell longitudinally relative to the positioner assembly.

The supporting assembly 36 includes a rear clevis portion 40 which is removably attached to the distal end of boom 22 by means of a split-sleeve type clamp 42 as shown in FIGS. 2 and 3. A flat elongated support 44 extends forwardly from the clevis portion 40 and has a transversely apertured rear portion 46 pivotally secured between spaced clevis arms 48 by a clevis pin 50. Pivoting of the support 44 about clevis pin 50 is effected by extension and retraction of a power cylinder 52; the latter having one end secured by pin 54 carried at the rear of the clevis portion 40 and its opposite end secured by a pin 56 insertable through spaced ears 58 extending from the support 44. The longitudinal center line of the support 44 is swingable about clevis pin 50 in a plane which would include the longitudinal axis of the boom 22 if such axis were extended forwardly beyond the end of the boom.

A pair of crank members, generally designated by numerals 60 and 62, respectively, are journaled for oscillatory pivotal movement on crank pins 64 and 66 mounted in spaced apart relation along the longitudinal center line of the support 44. The cranks 60 and 62 are herein disclosed as bell cranks having apertured hubs 68 and 70, respectively, with radially extending arms 72, 74 and 76, 78, respectively. As shown in FIG. 5, the crank pin 66 extends through aperture 80 in the support 44 and through an aligned aperture 82 in crank hub 70. The crank pin 66 has an enlarged head 84 which bears against the support 44 when a retaining plate 86 is secured in place over the other end of the pin 66 by screws 88. Preferably, the crank pin 66 is nonrotatably fixed in the arm aperture 80 due to a press fit therebetween, while the crank hub 70 is free to pivot about pin 66. A replaceable wear element 90 is provided between the relatively movable surfaces of the support 44 and hub 70. The crank 60 is attached to the support 44 in the same manner and by means of corresponding structural members as just described with respect to crank 62.

Figures 8, 9:
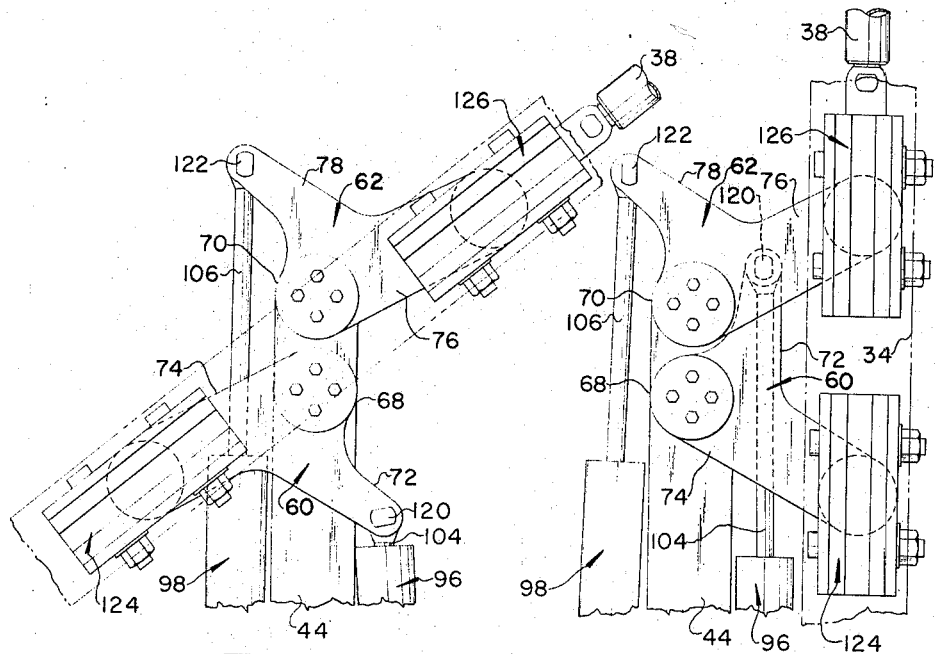
FIG. 8 is a view similar to FIG. 4 showing the positioner assembly in another operated condition.
FIG. 9 is a view similar to FIG. 8 showing the positioner assembly in another operated condition.

As seen in FIG. 3, the crank arms 72, 74 and 76, 78 are angularly spaced apart from one another about their associated hubs 68 and 70 at approximately right angles. In certain relative positions of the cranks 60 and 62, such as shown in FIGS. 3 and 4, interference between hubs 68 and 70 and the arms 72 and 78 is avoided by offsetting the arms 72 and 78 somewhat to one side of those lines which would be considered as their effective crank arms. The crank arms 72 and 78 are thickened at their free ends and provided with slots 92 and 94, respectively. As best shown in FIG. 2 in connection with crank 60, the arms 72, 74 and 76, 78 are spaced apart longitudinally with respect to the longitudinal axis of their respective hubs 68 and 70. Such spacing permits overlapping positioning of the arms 76 and 72, as shown in FIG. 9, and of the arms 74 and 78, as shown in FIG. 3.

A pair of identical power cylinders 96 and 98, comprising cylinder portions 100, 102 and extensible piston rods 104 and 106, are pivotally secured between the support 44 and the cranks 60 and 62, respectively. Mounting brackets 108 and 110 for the cylinder portions 100 and 102, respectively, extend from opposite sides of the support 44 in spaced relation along the length of the support 44. An apertured extension 112 of cylinder portion 100 is secured to bracket 108 by a pivot pin 114; and, in a similar manner, an apertured extension 116 of cylinder portion 102 is secured to bracket 110 by a pivot pin 118. The flat apertured end of piston rod 104 is secured in the slot 92 of crank arm 72 by a pivot pin 120; and, similarly, the flat apertured end of piston rod 106 is secured in the slot 94 of crank arm 78 by a pivot pin 122. From a comparison of FIGS. 3 and 10, it will be understood that the power cylinders 96 and 98 swing about the pivot pins 114 and 118, respectively, as their piston rods 104 and 106 are extended and retracted to impart turning moments to their associated crank arms 72 and 78, respectively.

As best shown in FIGS. 2 and 6, the guide shell 34 is mounted on the crank arms 74 and 76 by means of two identical clamp assemblies, generally indicated by numerals 124 and 126. Since the construction and operation of clamp assemblies 124 and 126 are alike, only assembly 126, shown in FIGS. 6 and 7, will be described in detail and assigned part reference numerals. The clamp assembly 126 comprises a pair of jaws 128, 130 held together by transverse nut and bolt fasteners 132 and 134. The jaws coact to define a slide way 136 which receives and slidably retains a bottom flange portion 138 of the guide shell 34. The guide shell is freely slidable longitudinally within the ways of the clamping assemblies 124 and 126 so that it may be longitudinally moved forward or backward in a conventional manner by the feed extension power cylinder 38 having its piston rod 140 secured to the guide shell by bracket 142 and its cylinder 144 secured to clamping assembly 126 by bracket 146 and pin 148. The clamping assembly 126 is pivotally mounted on the free end of crank arm 76 by means of a cylindrical shaft 150 which is integral with the jaw 128 and which is pivotally journaled in a bore 152 in the arm 76. A retainer plate 154 is secured to the shaft 150 by fasteners 156 to hold the shaft 150 and the arm 76 in assembled relationship as shown in FIG. 7.

A preferred power source and control system for the crank cylinders 96 and 98 are shown schematically in FIG. 11. While other power means may be employed to pivot the cranks 60 and 62, the disclosed means comprises a hydraulic pump P for supplying motive fluid to either side of the pistons of cylinders 96 and 90. Identical four-way valves V1 and V2 serve to supply and exhaust opposite sides of pistons 104 and 106 to effect power extension and retraction of the pistons and pivoting of associated cranks 60 and 62. Valves V1 and V2 are independently operable by any suitable means to provide variable fluid flow to the cylinders. Preferably the valves are spring returned to a neutral or blocking condition in the manner of a "dead man's" switch. The valves V1 and V2 may be conveniently located on a drill operator's console at a point remote from cylinders 96 and 98. Hydraulic conduits and cylinder fittings have not been illustrated in the drawings since such details of this type of equipment are well understood.

The operation of the positioner assembly 36 is as follows. In order to effect lateral movement of the guide shell 34 from one side of the boom 22 and support 44 to the other without angular swinging of the guide shell, the valves V1 and V2 are operated simultaneously to cause equal retraction or extension of the crank actuating cylinders 96 and 98. Such equal and complete extension of the fully retracted cylinders 96 and 98, shown in FIG. 3, will cause the guide shell to move from a limiting left-hand position laterally across the support 44 and the boom 22 through a central position shown in FIG. 10 and to a limiting right-hand position shown in FIG. 9 wherein the cylinders 96 and 98 are both fully extended. As both cylinders 96 and 98 extend at equal rates from the FIG. 3 condition to the FIG. 9 condition, the cranks 60 and 62 pivot at equal rates but in opposite directions causing the clamping assemblies 124 and 126 to be carried by crank arms 74 and 76, respectively, through an arcuate path from the left-hand to the right-hand side of the support 44. During such side-to-side traversal of the clamping assemblies 124 and 126, they will first separate longitudinally, reach their maximum separation in the FIG. 10 position, and then close together, in the FIG. 9 position, to their original longitudinal spacing along the guide shell 34. During such relative separating movement of the clamping assemblies 124 and 126, only clamping assembly 124 will slide back and forth with respect to the guide shell. The clamping assembly 126 will be held longitudinally with respect to the guide shell by the extension cylinder 38 and will, therefore, cause the guide shell to move so that the forward end thereof describes an arc. Since the clamping assemblies 124 and 126 are nonrotatable with respect to the guide shell 34 during crossover of the latter, relative rotation of the clamping assemblies and their supporting crank arms 74 and 76 takes place between the aforedescribed shafts 150 and the crank arm bores 152.

If the cylinders 96 and 98 are operated to produce unequal pivotal movement of cranks 60 and 62 in opposite directions, the guide shell 34 will not only move laterally but will also swing angularly with respect to the support 44.

Figure 10:
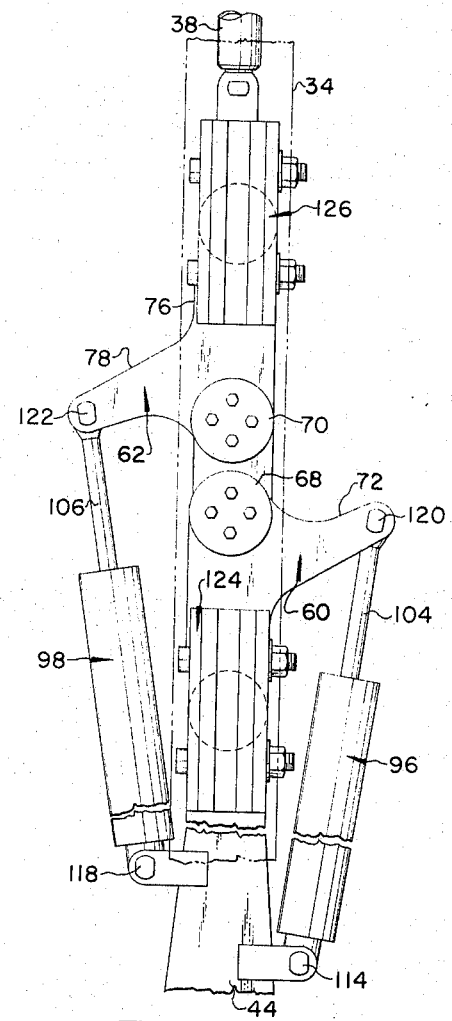
FIG. 10 is a view similar to FIG. 3 showing the positioner assembly in another operated condition.

To position the guide shell 34 at an angle to the boom 22 and support 44, control valves V1 and V2 are operated to power the crank cylinders 96 and 98 so that their piston rods are unequally extended. FIGS. 4 and 8 show the obtainable opposite extremes of angularity with respect to the axis of boom 22 wherein one of the crank cylinders is fully extended and the other is fully retracted. Innumerable positions of the guide shell 34 with respect to the boom 22, other than the extreme limiting positions shown in the drawings, are available. For example, the guide shell 34 may be swung angularly from the centerline position shown in FIG. 10 by extending or retracting only one of the piston rods 104 or 106. Assuming a starting position as shown in FIG. 10, if both rods 104 and 106 are extended, but rod 104 is extended farther than rod 106, the guide shell 34 will move in a single motion to the right side of the support 44 and will swing angularly in a counterclockwise direction.

From the foregoing it will be appreciated that control valves V1 and V2 can be manipulated by a drill operator to locate the guide shell 34 in incremental parallel positions between the limiting opposed positions shown in FIGS. 3 and 9 to achieve parallel crossover from one side of boom 22 to the other. Selective manipulation of control valves V1 and V2 also provides innumerable angular locations of the guide shell 34 with respect to the boom 22. In the usual manner, the entire rock drilling unit 28 is swingable about pivot 50 in vertical planes by the power cylinder 52.

Having described the invention in full, what I claim is:

1. A drill positioner for attachment to the distal end of an elongated drill boom, comprising:
    drill carrying means;
    support means attachable to said distal end of said boom and having a longitudinal centerline; and,
    dual pivot means for connecting said drill carrying means and said support means in movable relationship whereby individual pivotal movement of either of said pivot means provides angular swinging movement of said drill carrying means with respect to said centerline of said support means.

2. A drill positioner for attachment to the distal end of an elongated drill boom, comprising:
    drill carrying means;
    support means attachable to said distal end of said boom and having a longitudinal centerline; and,
    dual pivot means for connecting said drill carrying means and said support means in movable relationship whereby pivotal movement of both of said pivot means in the same direction provides angular swinging movement of said drill carrying means with respect to said centerline of said support means.

3. A drill positioner for attachment to the distal end of an elongated drill boom, comprising:
    drill carrying means;
    support means attachable to said distal end of said boom and having a longitudinal centerline; and,
    dual pivot means for connecting said drill carrying means and said support means in movable relationship whereby pivotal movement of said pivot means in opposite directions at unequal rates provides lateral shifting and angular swinging movement of said drill carrying means with respect to said centerline of said support means.

4. A drill positioner for attachment to the distal end of an elongated drill boom, comprising:
    drill carrying means;
    support means attachable to said distal end of said boom and having a longitudinal centerline; and,
    dual pivot means for connecting said drill carrying means and said support means in movable relationship whereby pivotal movement of said pivot means in opposite directions at equal rates provides lateral shifting without angular movement of said drill carrying means with respect to said centerline of said support means.

5. In a drill positioner having drill carrying means and support means for said drill carrying means, an improved mounting means connecting said drill carrying means and said support means, said mounting means comprising plural crank means pivotable to move said drill carrying means laterally with respect to said support means, and each of said crank means having a first arm individually connected to said drill carrying means and having a second arm individually connected to said support means by power means operable to pivot said crank means.

6. A drill positioner for attachment to the distal end of an elongated drill boom, comprising:
    drill carrying means;
    support means attachable to said distal end of said boom and having a longitudinal centerline;
    power actuated pivot means pivotably connecting said drill carrying means and said support means for positioning said drill carrying means on either side of said centerline; and
    said pivot means comprising cranks having first and second crank arms.

7. The invention set forth in claim 6, wherein the first arm of each crank is individually connected to said drill carrying means and the second arm of each crank is individually connected to said support means by power means operable to pivot said crank arms.

8. The invention set forth in claim 7, wherein said first arm of each crank carries connecting means which pivotably connects with said drill carrying means.

9. The invention set forth in claim 8, wherein said connecting means defines a way in which said drill carrying means is slidably retained.

10. A drill positioner for attachment to the distal end of an elongated drill boom, comprising:
    drill carrying means;
    support means attachable to said distal end of said boom and having a longitudinal centerline;
    power actuated plural pivot means mounted along said longitudinal centerline of said support means in spaced apart relationship for pivotably connecting said drill carrying means and said support means for positioning said drill carrying means on either side of said centerline.

References Cited

UNITED STATES PATENTS

| | | | |
|---|---|---|---|
| 2,690,896 | 10/1954 | Bissell et al. | 248—13 |
| 2,703,222 | 3/1955 | Feucht | 248—13 |
| 3,212,738 | 10/1965 | Curtis et al. | 248—16 |
| 3,226,064 | 12/1965 | Thompson | 248—16 |
| 3,304,033 | 2/1967 | Thompson | 248—16 |
| 3,338,316 | 8/1967 | Thompson | 173—43 |
| 3,374,975 | 3/1968 | Bronder | 248—16 |

ROY D. FRAZIER, Primary Examiner

J. FRANKLIN FOSS, Assistant Examiner

U.S. Cl. X.R.

74—480; 173—43; 248—2